(12) United States Patent
Rintoul

(10) Patent No.: US 7,157,030 B2
(45) Date of Patent: Jan. 2, 2007

(54) COMPOSITION FOR FILTRATION PARTICULATE MATERIAL

(75) Inventor: John Charles Rintoul, 120A 9th Road, Hyde Park, 2196 Johannesburg (ZA)

(73) Assignee: John Charles Rintoul, Johannesburg (ZA)

( * ) Notice: Subject to any disclaimer, the term of this patent is extended or adjusted under 35 U.S.C. 154(b) by 192 days.

(21) Appl. No.: 11/003,918

(22) Filed: Dec. 3, 2004

(65) Prior Publication Data

US 2005/0144918 A1 Jul. 7, 2005

Related U.S. Application Data

(63) Continuation of application No. PCT/ZA2003/00122, filed on Aug. 27, 2003.

(60) Provisional application No. 60/406,483, filed on Aug. 27, 2002.

(30) Foreign Application Priority Data

Feb. 25, 2003 (ZA) .................................. 2003/1512

(51) Int. Cl.
  *B01J 20/04* (2006.01)
(52) U.S. Cl. ...................... 264/117; 264/140; 264/144; 423/625; 502/415
(58) Field of Classification Search ...................... None
See application file for complete search history.

(56) References Cited

U.S. PATENT DOCUMENTS

| 4,120,942 A | * | 10/1978 | Spitzer et al. ............... 423/626 |
| 4,855,276 A | | 8/1989 | Osborne et al. |
| 5,560,876 A | * | 10/1996 | Boulanger et al. .......... 264/40.1 |
| 5,935,894 A | * | 8/1999 | Kanazirev ................... 502/341 |
| 6,004,522 A | | 12/1999 | England |

FOREIGN PATENT DOCUMENTS

| DE | 22 09 564 A | 9/1973 |
| GB | 1 295 133 A | 11/1972 |
| JP | 49 098397 A | 9/1974 |

OTHER PUBLICATIONS

PCT International Search Report mailed Jan. 29, 2004, for PCT International Application No. PCT/ZA03/00122.
PCT International Preliminary Examination Report mailed Sep. 29, 2004, for PCT International Application No. PCT/ZA03/00122.

* cited by examiner

*Primary Examiner*—Mary Lynn Theisen
(74) *Attorney, Agent, or Firm*—Knobbe Martens Olson & Bear LLP

(57) ABSTRACT

This invention relates to filtration particulate material for the removal of compounds from fluid streams. More particularly, this invention relates to a composition for filtration particulate material, method of manufacture of the filtration particulate material, filtration particulate material and the use of the filtration particulate material for the removal of compounds from fluid streams.

14 Claims, No Drawings

US 7,157,030 B2

COMPOSITION FOR FILTRATION PARTICULATE MATERIAL

RELATED APPLICATIONS

This application is a continuation, under 35 U.S.C. § 120, of International Patent Application No. PCT/ZA2003/00122, filed on Aug. 27, 2003 under the Patent Cooperation Treaty (PCT), which was published by the International Bureau in English on Mar. 11, 2004, which designates the U.S. and claims the benefit of U.S. Provisional Application No. 60/406,483, filed Aug. 27, 2002, and South African Patent Application No. 2003/1512, filed Feb. 25, 2003.

FIELD OF THE INVENTION

This invention relates to filtration particulate material for the removal of compounds from fluid streams. More particularly, this invention relates to a composition for filtration particulate material, method of manufacture of the filtration particulate material, filtration particulate material and the use of the filtration particulate material for the removal of compounds from fluid streams.

BACKGROUND OF THE INVENTION

Control of gaseous pollutants such as hydrogen sulphide, carbon monoxide, ammonia, oxides of nitrogen, chlorine, formaldehyde, urea, volatile organic compounds etc. is normally required for environmental, corrosion, health and safety reasons. It is known in the art that gas mixtures containing one of more of these pollutants can be passed through filtration particulate material with chemical reactants which absorb, adsorb and/or react chemically with the pollutants to remove them from the gas mixture. Normally, filtration particulate material comprises an inert porous carrier with a large surface area for adsorption or for carrying chemical reactants.

It is further known in the art that certain pollutants can be removed by oxidation with permanganate. Permanganate containing filtration particulate material is disclosed in U.S. Pat. No. 6,004,522. Alkaline salts are also used in filtration particulate material to remove certain pollutants from a gas mixture. A small portion of free water needs to be present on the carrier to allow ionisation of the permanganate salt and/or other salts and to facilitate transfer of the ions to and from the reaction zone of the particulate matter. It will be appreciated that the higher the effective permanganate portion carried on the carrier, the more effective the particulate matter. However, the particulate matter is usually in the form of relatively dry granules or pellets and the free water therefore limited which, in turn, limits the portion of ionised permanganate and/or other salts. Non-ionised permanganate salts tend to crystallize and clog the pores of the carrier, which decreases the particulate material's efficacy. Known ways of increasing free water on the carrier are to use a hydrophilic carrier and/or to add a hygroscopic salt to the carrier. U.S. Pat. No. 6,004,522 discloses the use of sodium bicarbonate as a hygroscopic salt, however elevated levels of sodium bicarbonate also clogs the pores of the carrier and contributes in the formation of a hard medium, which decrease the particulate material's efficacy. This alkaline salt also contributes to the removal of acidic gases from a gas mixture. U.S. Pat. No. 6,004,522 puts forward the theory that the hygroscopic ionisation of the permanganate allows migration of the permanganate ions from inside the carrier media to the outside, as the permanganate on the surface of the carrier media is chemically reduced, in use.

SUMMARY OF THE INVENTION

In this specification, percentage of a constituent of the composition will be understood to mean percentage of weight of the finished product.

According to a first aspect of the invention, there is provided a composition for filtration particulate material which includes modified hydrated alumina, which has been prepared with activated alumina powder, which has been treated with excess water, cured, calcined and grinded into a powder.

The composition may include at least one oxidising agent.

The oxidising agent may be a permanganate, chlorate, perchlorate, peroxide, dichromate or the like salt or metal dioxides.

The composition may further include an alkaline salt selected from one or more of the group including combinations of alkali and/or alkali earth metal ions with carbonate ions, bicarbonate ions, hydroxide ions, oxide ions, peroxide ions and/or peroxy carbonate ions. Ions of other metals may also be used. The alkaline salt may be between 5% and 50% of the composition for a filtration particulate material.

Preferably, the composition may include a carbonate such as potassium carbonate or sodium carbonate and/or bicarbonate such as potassium bicarbonate.

The composition may further include alumina powder. The alumina powder may be activated alumina powder.

Instead of an oxidising agent, the composition may further include activated carbon powder and an acid, such as phosphoric acid, for example, for the removal of amines.

The modified hydrated alumina powder may, for example, be prepared with activated alumina powder, which has been treated with excess water worked into balls, pellets or granules, and cured at about room temperature for about two weeks, calcined and ground into a powder. The calcine temperature may be between about 300° C. to 350° C. It will be appreciated that various methods may be employed to hydrate and modify alumina powder.

DETAILED DESCRIPTION OF THE PREFERRED EMBODIMENT

The applicant has found that modified hydrated alumina powder, compared to standard alumina powder, has a lower rehydration rate and temperature and is advantageously subject to less shrinkage during the curing step of the manufacturing of the filtration particulate material. The modified hydrated alumina's resistance to shrinkage allows the inert carrier of the filtration particulate material to lose less of its porous structure during curing and therefore the inert carrier has a larger surface area, which increases the modified hydrated alumina's efficacy. By manipulating the level of calcining during modification of the alumina and/or by manipulating the ratio of modified hydrated alumina powder to alumina powder in the filtration particulate material, the porosity, pore structure, size and/or pore distribution of the filtration particulate material can be manipulated. The modified hydrated alumina also allows higher percentages of active chemistry, salts, to be incorporated into the particulate material while still retaining the physical integrity of the particulate matter. The applicant believes that the shrink resistant modified alumina functions as reinforcement for reinforcing the inert carrier during the balling process and assists in ball formation when slippery or soapy alkaline salts are included in the composition.

The permanganate salt may be sodium or preferably potassium permanganate. The composition may include at least 3% potassium permanganate. Preferably, the composition includes between 3 and 10% potassium permanganate.

The composition may include at least 5% alkaline salt. Preferably, the composition includes between 5 and 30% alkaline salt.

The alkaline salt may be metal oxides and/or metal hydroxides. It will be appreciated that metal oxides such a sodium oxide forms a hydroxide in water.

The composition may include at least 5% modified alumina powder. Preferably, the composition includes between 5 and 30% modified alumna powder.

The composition may include at least 5% free water, preferably between 5 and 30%. Free water will be understood to mean water available to ionise salts.

The composition may include any other oxidising agent in addition to the permanganate, such as manganese dioxide, salts of dichromate, chromate and the like.

According to a second aspect of the invention there is provided a method of manufacture of filtration particulate material which includes the step of mixing modified hydrated alumina and an oxidising agent and/or alkaline salt.

Instead of an oxidising agent, the modified alumina may be mixed with activated carbon.

The mixing step may include rolling a substantially dry powdery composition of modified hydrated alumina and alumina powder in a pellet or granule forming rotating drum or pan and adding to the rolling composition at least one concentrated solution of an oxidising agent and/or alkaline salt such that particulate material in the form of pellets or granules form.

The dry powdery composition may include any or all of the components except the oxidising agent.

The concentrated solution may be added by spraying the solution onto the dry powdery composition.

The concentrated solution may, in addition to an oxidising agent and/or alkaline salt, include any of the other soluble components of the filtration particulate material.

Instead, the mixing step may include mixing a concentrated solution of an oxidising and/or alkaline salt to a substantially dry powdery composition of modified hydrated alumina, mixed and the method further including a step of extruding or casting into rods, pellets or any other suitable particulate shape to form the particulate material.

The method may include the steps of drying the particulate material at an elevated temperature and allowing the particulate material to cool over a period of more than one day.

The oxidising agent may be a permanganate salt.

The quantity and contents of the concentrated solution and the quantity of the modified hydrated alumina and alumina powder, is selected to provide a composition for filtration particulate material as described above.

The concentrated solution may be added by spraying the composition onto the powdery composition. The concentrated solution may be heated to just below its boiling point.

Heat and/or radiation may be employed over the rotating drum or pan.

More than one different concentrated chemical solution may be sprayed simultaneously onto the rolling composition each solution being sprayed onto a different pellet or granule size zone of the rolling composition to form particulate material having layers of different chemical compositions.

The particulate material may be heat cured at about 60° C. for about 12 hours.

The particulate material may, for some compositions, be treated at between 300° C. and 350° C. to harden the particulate material. It will be appreciated that certain oxidizing agents may decompose at such elevated temperatures and this treatment may follow if no, or limited, decomposition occurs. The time at which the particulate material is kept at 300° C. to 350° C. may also be determined by the rate of decomposition of the oxidising agent or other chemicals at this temperature.

In certain instances the decomposition of the bicarbonate salt may be preferred in order to increase the porosity of the filtration particulate material, and the particulate material heated accordingly.

According to a third aspect of the invention, there is provided filtration particulate material, as described above.

According to a fourth aspect of the invention, there is provided the use of the filtration particulate material as described above for the removal of compounds from fluid streams.

The fluid stream may be a gas mixture emitted by a chemical process or more than one process located in the same general area.

In use, the bicarbonate would react with certain acidic gases while, where included in the composition, the carbonate would react with sulphide gases.

The filtration particulate material, in accordance with the invention, may be used for purifying polluted air or to remove odours from air for hotels, airports, hospitals, office buildings, restaurants, shopping malls, sewage treatment plants and the like. The filtration particulate material, in accordance with the invention, may also be used for maintaining ultra pure air in semiconductor manufacturing facilities.

The filtration particulate material, in accordance with the invention, may also be used for industrial applications such as emission and/or corrosion control in the steel, petrochemical, paper, sewage treatment and the like industries to protect sensitive electronics and other equipment such as electric motors and compressors in chemical plant environments.

More particularly, the filtration particulate material may be used to filter toxic, corrosive, irritant and/or odorous gas streams. Toxic gas streams may for example contain chlorinated hydrocarbons, volatile organic compounds and/or the like. Corrosive gas streams may for example contain inorganic chlorides, sulphur compounds, nitrogen oxides and/or the like. Irritant gas streams may for example contain ammonia, amine, chlorine, toluene, formaldehyde and/or the like.

The applicant has found that the use of potassium bicarbonate instead of sodium bicarbonate has several advantages. Potassium bicarbonate does not decompose as readily as sodium bicarbonate, above about 160° C. instead of above about 50° C. This enables the particulate material, in accordance with the invention, to be dried and/or cured at up to about 160° C. without substantial decomposition of the particulate material and the structural integrity of the particulate matter is maintained during manufacture. During use of the particulate material, as the potassium bicarbonate reacts with acidic gases, it releases $CO_2$ gas and water, which in turn increases the hygroscopic nature of the particulate material, which contributes to the availability of permanganate ions and other reactive chemistry ions. Thus, during use the effectiveness of the particulate material is maintained or even increased. Further, the use of modified alumina powder, together with potassium bicarbonate assists in maintaining a less dense medium as addition of water to modified alumina results in less heat of rehydration and less subsequent shrinkage and densification.

The applicant has also found that carbonates are more useful than bicarbonates in certain compositions. Significantly higher proportions of reactive alkaline chemistry can be incorporated into the filtration particulate material whilst still maintaining ball integrity when potassium bicarbonate is used, provided that 160° C. is not exceeded in the curing process. Hydrogen sulphide gas also reacts readily with carbonates, which enhances the removal capacity of the filtration particulate material regarding sulphide gases and its oxidation capacity. Carbonates also enhance the hygroscopic nature of the filtration particulate matter.

The invention is now further described by way of non-limiting examples of a composition for filtration particulate material, in accordance with the invention.

EXAMPLE 1

A composition for filtration particulate material includes 8% potassium permanganate and 15% modified hydrated alumina powder, which has been prepared with activated alumina powder, which has been treated with excess water, cured calcined and grinded into a powder. The composition also includes 12% sodium carbonate, 20% water and alumina making up the remainder of the composition. The method of manufacture of the filtration particulate material having the above composition includes the steps of rolling a substantially dry powdery composition of the modified hydrated alumina and alumina powder in a pellet forming rotating drum. Concentrated solutions of the potassium permanganate and sodium carbonate are sprayed onto the rolling modified hydrated alumina powder and alumina to form pellets. The formed pellets are cured at 60° C. for 12 hours and allowed to cool over a period of more than one day. The pellets are then screened and sorted into different pellet sizes.

EXAMPLE 2

A composition as described in Example 1, which includes 12% potassium carbonate instead of 12% sodium carbonate.

EXAMPLE 3

A composition for filtration particulate material includes 8% potassium permanganate, 50% alumina powder and 15% modified hydrated alumina. The composition also includes 12% potassium bicarbonate and 15% water. The method of manufacture of the filtration particulate material having the above composition includes the steps of rolling a substantially dry powdery composition of the alumina powder in a pellet forming rotating drum. Concentrated solutions of the potassium permanganate and potassium bicarbonate are sprayed onto the rolling alumina powder to form pellets. The formed pellets are cured at 60° C. for 12 hours and allowed to cool over a period of more than one day. The pellets are then screened and sorted into different pellet sizes.

Alternatively, the potassium bicarbonate is blended with the alumina powder in a dry state and the mixture thereof added to the rotating drum. The mixture is then sprayed with a concentrated solution of the potassium permanganate.

EXAMPLE 4

A composition for filtration particulate material includes 8% potassium permanganate and 15% modified hydrated alumina powder, which has been prepared with activated alumina powder, which has been treated with excess water, cured calcined and grinded into a powder. The composition also includes 12% potassium bicarbonate, 20% water and alumina making up the remainder of the composition. The method of manufacture of the filtration particulate material having the above composition includes the steps of rolling a substantially dry powdery composition of the modified hydrated alumina and alumina powder in a pellet forming rotating drum. Concentrated solutions of the potassium permanganate and potassium bicarbonate are sprayed onto the rolling modified hydrated alumina powder and alumina to form pellets. The formed pellets are cured at 60° C. for 12 hours and allowed to cool over a period of more than one day. The pellets are then screened and sorted into different pellet sizes.

EXAMPLE 5

A composition for filtration particulate material includes 5% potassium permanganate, 50% alumina powder and 15% modified hydrated alumina. The composition also includes 10% sodium carbonate, 5% potassium bicarbonate and 15% water. The method of manufacture of the filtration particulate material having the above composition includes the steps of rolling a substantially dry powdery composition of the alumina powder and the other components, except the potassium permanganate and potassium bicarbonate, in a pellet forming rotating drum. Concentrated solutions of the potassium permanganate and potassium bicarbonate are sprayed onto the rolling alumina powder to form pellets. The formed pellets are cured at 60° C. for 12 hours and allowed to cool over a period of more than one day. The pellets are then screened and sorted into different pellet sizes.

EXAMPLE 6

A composition as described in Example 5, wherein 10% potassium carbonate is used instead of 10% sodium carbonate.

EXAMPLE 7

A composition for filtration particulate material includes 8% potassium permanganate, 47% alumina powder and 15% modified hydrated alumina. The composition also includes 10% sodium carbonate, 5% potassium bicarbonate and 15% water. The method of manufacture is the same as for Example 5.

EXAMPLE 8

A composition as described in Example 7, wherein 10% potassium carbonate is used instead of 10% sodium carbonate.

EXAMPLE 9

A composition for filtration particulate material includes 5% potassium permanganate, 50% alumina powder and 15% modified hydrated alumina. The composition also includes 5% sodium carbonate, 5% potassium carbonate, 5% potassium bicarbonate and 15% water. The method of manufacture is the same as for Example 5.

EXAMPLE 10

A composition for filtration particulate material includes 8% potassium permanganate, 47% alumina powder and 15% modified hydrated alumina. The composition also includes 5% sodium carbonate, 5% potassium carbonate, 5% potassium bicarbonate and 15% water. The method of manufacture is the same as for Example 5.

EXAMPLE 11

A composition for filtration particulate material includes 8% potassium permanganate, 47% alumina powder and 15% modified hydrated alumina. The composition also includes 10% calcium dioxide, 5% potassium bicarbonate and 15% water. The method of manufacture is the same as for Example 5.

EXAMPLE 12

A composition for filtration particulate material includes 8% potassium permanganate, 47% alumina powder and 15% modified hydrated alumina. The composition also includes 10% copper oxide, 5% potassium bicarbonate and 15% water. The method of manufacture is the same as for Example 5.

EXAMPLE 13

A composition for the removal of amines includes 25% of a 10% w/w mixture of phosphoric acid and fine activated granular carbon mixture, 50% alumina, 10% modified alumina and 15% water.

EXAMPLE 14

A further composition for the removal of amines includes 25% of a 10% w/w mixture of phosphoric acid and fine mesh granular carbon mixture, 45% alumina, 10% modified alumina, 5% phosphoric acid and 15% water.

EXAMPLE 15

A composition for the removal of acidic gases includes 25% of a 10% w/w mixture of sodium hydroxide and fine activated granular carbon mixture, 50% alumina, 10% modified alumina and 15% water.

What is claimed is:

1. A method for manufacturing a composition suitable for use as a filtration particulate material, the method comprising the steps of:
    modifying a first activated alumina, wherein the step of modifying the first activated alumina comprises:
        hydrating the first activated alumina by treating the activated alumina with an excess water to form a hydrated alumina paste;
        curing the hydrated alumina paste, whereby a cured alumina is obtained;
        calcining the cured alumina, whereby a calcined alumina is obtained; and
        grinding the calcined alumina into a powder, whereby a modified activated alumina is obtained; and
    mixing the modified activated alumina with a substantially dry and powdery second activated alumina, whereby a composition suitable for use as a filtration particulate material is obtained.

2. The method of claim 1, further comprising the step of: mixing the modified activated alumina and the substantially dry and powdery second activated alumina with at least one additional component selected from the group consisting of oxidizing agents, alkaline earth metal salts, alkali metal salts, and mixtures thereof.

3. The method of claim 2, wherein the oxidizing agent is selected from the group consisting of permanganates, chlorates, perchlorates, peroxides, dichromates, metal dioxides, and mixtures thereof.

4. The method according to claim 2, wherein the alkaline earth metal salts are selected the group consisting of carbonates, bicarbonates, hydroxides, oxides, peroxides, and peroxycarbonates.

5. The method of claim 2, wherein the alkali metal salts are selected the group consisting of carbonates, bicarbonates, hydroxides, oxides, peroxides, and peroxycarbonates.

6. The method according to claim 2, wherein the step of mixing comprises:
    mixing the modified activated alumina with a substantially dry and powdery second activated alumina;
    adding to the mixture of modified activated alumina and second activated alumina a concentrated solution of at least one component selected from the group consisting of an oxidizing agent, an alkaline earth metal salt, an alkali metal salt, and mixtures thereof, whereby a rolling composition is obtained; and
    rolling the rolling composition in a rotating drum or a pan, whereby pellets or granules suitable for use as a filtration particulate material are obtained.

7. The method of claim 5, wherein the step of adding comprises spraying the concentrated solution onto the mixture of modified activated alumina and second activated alumina.

8. The method of claim 6, further comprising the step of: heating the concentrated solution to a temperature just below a boiling point of the concentrated solution, wherein the step of heating is conducted before the step of adding.

9. The method of claim 2, wherein the step of mixing comprises:
    mixing the modified activated alumina with a substantially dry and powdery second activated alumina;
    adding to the mixture of modified activated alumina and second activated alumina a concentrated solution of at least one component selected from the group consisting of an oxidizing agent, an alkaline earth metal salt, an alkali metal salt, and mixtures thereof; and
    extruding or casting the mixture into a particulate shape selected from the group consisting of rods, pellets, and mixtures thereof, whereby a filtration particulate material is obtained.

10. The method of claim 1, further comprising the steps of:
    drying the filtration particulate material at an elevated temperature of about 60° C.; and
    allowing the dried filtration particulate material to cool to room temperature over a period of more than one day.

11. The method of claim 1, further comprising the step of: working the hydrated alumina paste into a form selected from the group consisting of balls, pellets, and granules.

12. The method of claim 6, further comprising the step of: curing the pellets or granules at a temperature of about 60° C. for about 12 hours.

13. The method of claim 1, wherein the cured alumina is calcined at a temperature of from 300° C. to 350° C.

14. The method of claim 1, further comprising the step of: mixing the composition with activated carbon.

* * * * *